United States Patent
Lauer et al.

(10) Patent No.: US 7,453,865 B2
(45) Date of Patent: Nov. 18, 2008

(54) COMMUNICATION CHANNELS IN A STORAGE NETWORK

(75) Inventors: John Donald Lauer, Tucson, AZ (US); Miguel A. Duenas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 11/060,192

(22) Filed: Feb. 16, 2005

(65) Prior Publication Data

US 2006/0184672 A1    Aug. 17, 2006

(51) Int. Cl.
*H04L 12/28* (2006.01)

(52) U.S. Cl. .......................... 370/351; 370/254

(58) Field of Classification Search ............... 370/225, 370/254, 351; 707/1, 3; 709/201, 203, 223, 709/225, 231, 238, 239
See application file for complete search history.

(56) References Cited

U.S. PATENT DOCUMENTS

| | | | |
|---|---|---|---|
| 5,633,999 A * | 5/1997 | Clowes et al. ............ | 714/6 |
| 6,487,607 B1 | 11/2002 | Wollrath et al. | |
| 6,549,955 B2 | 4/2003 | Guthrie et al. | |
| 6,574,618 B2 * | 6/2003 | Eylon et al. .............. | 707/1 |
| 6,629,128 B1 | 9/2003 | Glass | |
| 6,704,768 B1 * | 3/2004 | Zombek et al. ........... | 709/201 |
| 6,735,200 B1 | 5/2004 | Novaes | |
| 7,305,375 B2 * | 12/2007 | Cioccarelli ............... | 707/1 |
| 2002/0114341 A1 | 8/2002 | Sutherland et al. | |
| 2002/0116205 A1 * | 8/2002 | Ankireddipally et al. ... | 705/1 |
| 2003/0070006 A1 | 4/2003 | Nadler et al. | |
| 2003/0095504 A1 | 5/2003 | Ogier | |
| 2003/0115379 A1 | 6/2003 | Burton et al. | |
| 2003/0154238 A1 | 8/2003 | Murphy et al. | |
| 2003/0177170 A1 | 9/2003 | Glass | |
| 2003/0177205 A1 | 9/2003 | Liang et al. | |
| 2003/0179742 A1 | 9/2003 | Ogier et al. | |

(Continued)

FOREIGN PATENT DOCUMENTS

EP    1135001 A2    9/2001

OTHER PUBLICATIONS

U.S. Patent Application entitled "Dynamic Generator for Fast-Client Static Proxy from Service Interface", U.S. Appl. No. 10/428,206, filed Apr. 30, 2003, by inventor Y. Yoon.

(Continued)

*Primary Examiner*—Chirag G Shah
*Assistant Examiner*—Srinivasa R Reddivalam
(74) *Attorney, Agent, or Firm*—Rabindranath Dutta; Konrad Raynes & Victor LLP

(57) ABSTRACT

Provided are a method, system and article of manufacture, wherein a first application receives a message from a second application, wherein both the first application and the second application execute on a node of a network that comprises a plurality of nodes. The first application also receives an identifier corresponding to a channel over which at least one other application can communicate with the second application, wherein the channel is a logical connection at an application level. The identifier that corresponds to the channel is stored with an identity of the second application. The stored identifier is accessed to allow the at least one other application to communicate with the second application over the channel.

20 Claims, 12 Drawing Sheets

U.S. PATENT DOCUMENTS

| | | |
|---|---|---|
| 2003/0182427 A1 | 9/2003 | Halpern |
| 2003/0208640 A1 | 11/2003 | Just |
| 2004/0010575 A1 | 1/2004 | Wookey et al. |
| 2004/0103407 A1 | 5/2004 | Blaukopf et al. |
| 2004/0158780 A1 | 8/2004 | Conrad |
| 2005/0021707 A1* | 1/2005 | Fendt .......................... 709/223 |

OTHER PUBLICATIONS

U.S. Patent Application entitled "Reconfiguring a Network by Utilizing a Predetermined Length Quiescent State", U.S. Appl. No. 10/436,222, filed May 12, 2003, by inventors C.H. Chang; O.T. Kirby, D.D. Jurgensen, and F. Knop.

Great Britain patent application entitled "Data Processing Systems", Serial No. 0227872.2, filed Nov. 29, 2002, by inventors P.N. Cashman, C.F. Fuente, W.J. Scales.

U.S. Patent Application entitled "Interface for Application Components", U.S. Appl. No. 10/990,652, filed Nov. 16, 2004, by inventors J.D. Lauer, and Y.Xu.

U.S. Patent Application entitled "Node Discovery and Communications in a Network", U.S. Appl. No. 10/991,288, filed Nov. 16, 2004, by inventors J.D. Lauer, and Y.Xu.

S. Floyd, et al., "The Synchronization of Periodic Routing Messages", IEEE/ACM Transactions on Networking, Apr. 1994, [online], pp. 1-28. [Retrieved on Nov. 16, 2004]. Retrieved on the Internet at <URL: http://www.cs.wisc.edu/~suman/courses/640/s04/handouts/papers/floyd94synchronization.pdf>.

* cited by examiner

COMMUNICATION CHANNELS IN A STORAGE NETWORK

BACKGROUND

1. Field

The disclosure relates to a method, system, and article of manufacture for communications channels in a storage network.

2. Background

A network may include a collection of nodes, such as computing systems, storage servers, etc., that are in communication with each other over communication links. There are many types of network, including local area networks (LAN), wide area networks (WAN), intranet, Internet, Storage Area Networks (SAN), etc. A high-speed subnetwork of storage servers and storage devices may be included in a SAN, where the storage servers may provide or control access to data that may be stored in the storage devices. For example, IBM* TotalStorage* Enterprise Storage Servers* (ESS) may function as storage servers in a SAN environment.

IBM, TotalStorage, and Enterprise Storage Server are trademarks or registered Trademarks of IBM corporation.

A communication channel may allow communication between two entities. For example, two nodes, such as, a client node and a server node, of a network may communicate via a communication channel. A variety of communication protocols may be used to communicate over communication channels. For example, the Transmission Control Protocol or First in First Out (FIFO) mechanisms may be used to communicate over certain communication channels.

The Transmission Control Protocol may require point-to-point communication channels. Implementations of the Transmission Control Protocol may provide a reliable delivery of messages from a local node to a remote node. However, implementations of the Transmission Control Protocol may not indicate whether an application on the remote node accepted a message without error, where the message was sent by the local node.

FIFO mechanisms may demultiplex incoming messages for a server, but may need separate channels for outgoing messages to clients. Additionally, FIFO mechanisms may send outgoing messages from a server through one buffer. As a result, a selected client may not be able to determine when to read messages from the server that are meant for the selected client.

SUMMARY OF THE DESCRIBED EMBODIMENTS

Provided are a method, system and article of manufacture, wherein a first application receives a message from a second application, wherein both the first application and the second application execute on a node of a network that comprises a plurality of nodes. The first application also receives an identifier corresponding to a channel over which at least one other application can communicate with the second application, wherein the channel is a logical connection at an application level. The identifier that corresponds to the channel is stored with an identity of the second application. The stored identifier is accessed to allow the at least one other application to communicate with the second application over the channel.

In certain embodiments, the network is a storage area network, wherein the node is a storage server, wherein the first application is a message router, wherein the second application and the at least one other application comprise software components, and wherein some software components register with the message router to be informed of events over channels.

In further embodiments, the node is a first node, wherein a routing table stores entries that include information on a communication status of at least one node of the plurality of nodes in the network, wherein the communication status of the at least one node indicates whether the at least one node is offline. The first application sends the received message to an alternate node, in response to determining from the routing table that a destination address of the received message corresponds to the offline node.

In still further embodiments, the node is a first node, wherein the first application generates a message identifier that uniquely identifies the message. The message identifier is inserted in a header of the message. The message is sent to a second node of the plurality of nodes. A notification is received, wherein the notification indicates receipt of the message from the second node, and wherein the notification also includes the generated message identifier. The first application communicates to the second application that the message has been successfully delivered.

In yet further embodiments, a message router at the second node receives the message. The message is delivered to one application in the second node, in response determining that the message is for the second node. The message is rerouted to a third node, in response to determining that the message is for the third node. The received message is deleted, in response to determining that a destination of the message is unknown.

In additional embodiments, the node is a first node, wherein the message is sent and an acknowledgement of a reception of the message is awaited. A deletion is made of an entry corresponding to the message if the acknowledgement is received. A communication is sent to the second application over the channel, wherein the communication provides an indication of the reception of the message.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
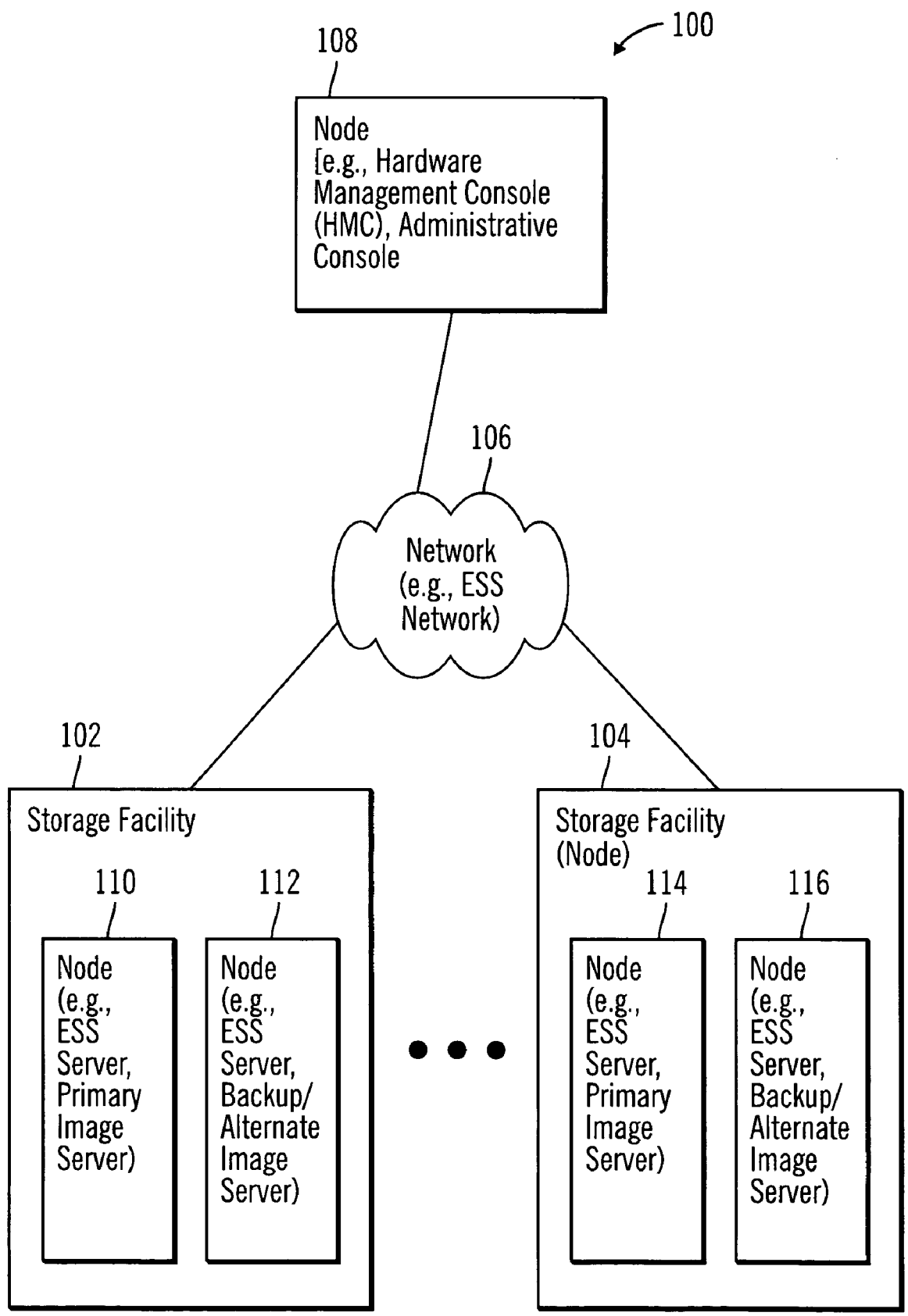
FIG. 1 illustrates a block diagram of a computing environment in accordance with certain embodiments.

FIG. 1 illustrates a block diagram of a computing environment 100 in accordance with certain embodiments. The computing environment 100 includes one or more storage facilities 102, 104 in communication over a network 106 to an administrative console 108.

The storage facilities 102, 104 may be comprised of two or more nodes. For example, storage facility 102 may comprise a primary image server 110 and an alternate image server 112, and the storage facility 104 may comprise a primary image server 114 and an alternate image server 116. In certain embodiments, the alternate image servers 112 and 116 may store backup data of the primary image servers 110 and 114 respectively. In certain other embodiments, the nodes 110, 112, 114, 116 may be ESS servers.

In certain embodiments, the nodes 108, 110, 112, 114, 116 may comprise any suitable computational device, including those presently known in the art, such as, a storage server, a server, a personal computer, a workstation, a mainframe, a midrange computer, a network appliance, a palm top computer, a telephony device, a blade computer, a hand held computer, etc. The nodes 108, 110, 112, 114, 116 may be deployed in the computing environment 100 as nodes of the network 106, where the network 106 may include any suitable network, including those presently known in the art, such as, a SAN, a LAN, an Intranet, the Internet, an ESS network, etc.

Therefore, FIG. 1 illustrates certain embodiments in which a plurality of nodes 108, 110, 112, 114, 116 that may include storage servers are coupled over a network 106. The plurality of nodes may send messages over the network 106.

Figure 2:
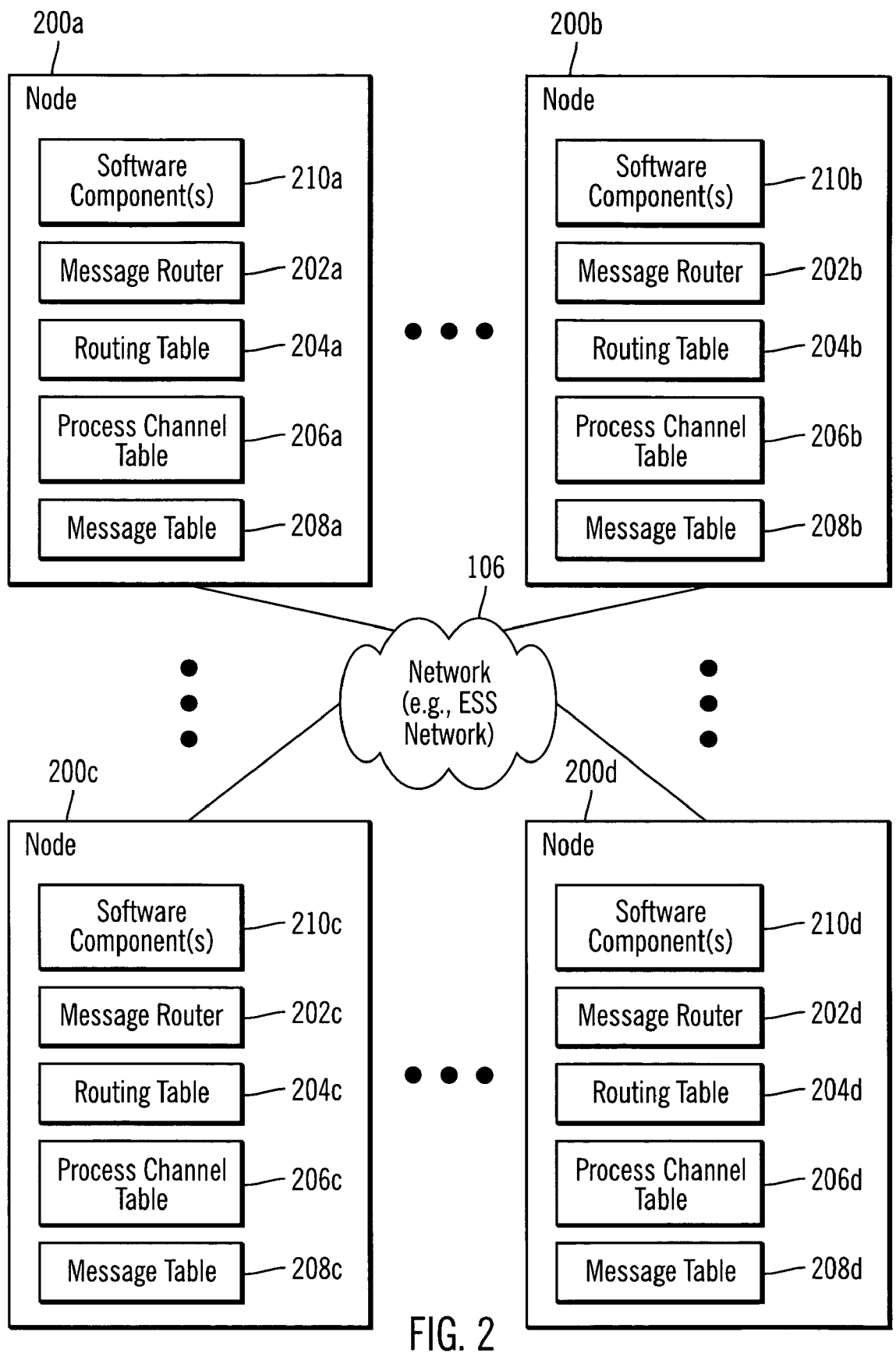
FIG. 2 illustrates a block diagram that shows components and data structures included in the nodes of the computing environment, in accordance with certain embodiments.

FIG. 2 illustrates a block diagram that shows components and data structures included in exemplary nodes of the computing environment 100, in accordance with certain embodiments.

In FIG. 2, a plurality of exemplary nodes 200a, 200b, 200c, 200d are coupled over the network 106. The exemplary nodes 200a, 200b, 200c, 200d may include the nodes 108, 110, 112, 114, 116 illustrated in FIG. 1. For example, in certain embodiments the node 200a may be the administrative console 108, and nodes 200b, 200c, 200d may be the nodes 110, 114, 116 respectively. In alternative embodiments, there may be a fewer or a greater number of nodes that communicate over the network 106.

Each of the nodes 200a, 200b, 200c, 200d may include a message router, a routing table, a process channel table, a message table, and one or more software components. For example, the exemplary node 200a may include a message router 202a, a routing table 204a, a process channel table 206a, a message table 208a and one or more software components 210a. The exemplary node 200b may include a message router 202b, a routing table 204b, a process channel table 206b, a message table 208b and one or more software components 210b. Similarly, the exemplary node 200c may include a message router 202c, a routing table 204c, a process channel table 206c, a message table 208c and one or more software components 210d, and the exemplary node 200d may include a message router 202d, a routing table 204d, a process channel table 206d, a message table 208d and one or more software components 210d.

In certain embodiments, the message routers 202a, 202b, 202c, 202d are capable of sending and receiving messages over the network 106. The message routers 202a, 202b, 202c, 202d may include applications implemented in software, hardware, firmware, or any combination thereof.

In certain embodiments, the routing tables 204a, 204b, 204c, 204d may include entries corresponding to a set of nodes and a status field that indicates whether a node is online, i.e., available for message communications, or offline, i.e., unavailable for message communications. For example, the routing table 204a on node 200a may store entries corresponding to nodes 200b, 200d that indicate that node 200b is offline and node 200d is online.

The process channel tables 206a, 206b, 206c, 206d may include entries corresponding to the software components 210a, 210b, 210c, 210d and associated process channel identifiers, where a process channel identifier is a communication channel between a message router and a software component. A channel may be a logical connection between two entities at the application level. For example, a first entity may be the message router 202a and the second entity may be a one of the software components 210a.

The message tables 208a, 208b, 208c, 208d may include entries corresponding to messages for which a response is awaited by a message router. The message tables 208a, 208b, 208c, 208d may include corresponding message identifiers of the messages.

The software components 210a, 210b, 210c, 210d may communicate with corresponding message routers 202a, 202b, 202c, 202d over communication channels.

Therefore, FIG. 2 illustrates certain embodiments in which a plurality of nodes 200a, 200b, 200c, 200d communicate over a network 106, where each node has a message router that communicates to other message routers and to software components. Exemplary data structures, such as routing tables 204a, 204b, 204c, 204d, process channel tables 206a, 206b, 206c, 206d, and message tables 208a, 208b, 208c, 208d may be used for the establishment of communication channels, and may also be used in message communications among the software components 210a, 210b, 210c, 210d and the message routers 202a, 202b, 202c, 202d.

Figure 3:
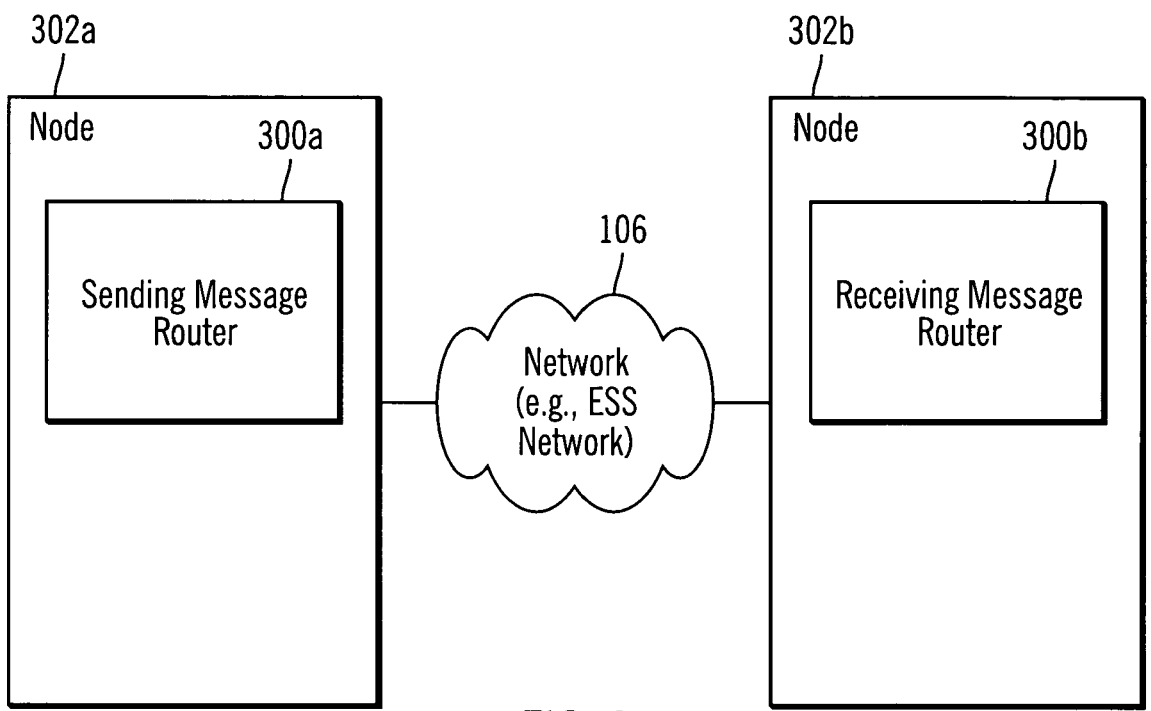
FIG. 3 illustrates a block diagram that shows two message routers communicating over a network, in accordance with certain embodiments.

FIG. 3 illustrates a block diagram that shows two exemplary message routers 300a, 300b communicating over the network 106, in accordance with certain embodiments. For example, in certain embodiments the exemplary message router 300a may be the message router 202b of FIG. 2, and the exemplary message router 300b may be the message router 202d of FIG. 2.

In certain embodiments the message router 300a may be a "sending" message router, and the message router 300b may be a "receiving" message router. The sending message router 300a of node 302a may send messages to the receiving message router 300b of node 302b. The message routers 300a, 300b may also route messages between different software components of the same node.

Therefore, FIG. 3 illustrates certain embodiments in which a sending message router in one node sends messages to a receiving message router in another node over the network 106.

Figure 4:
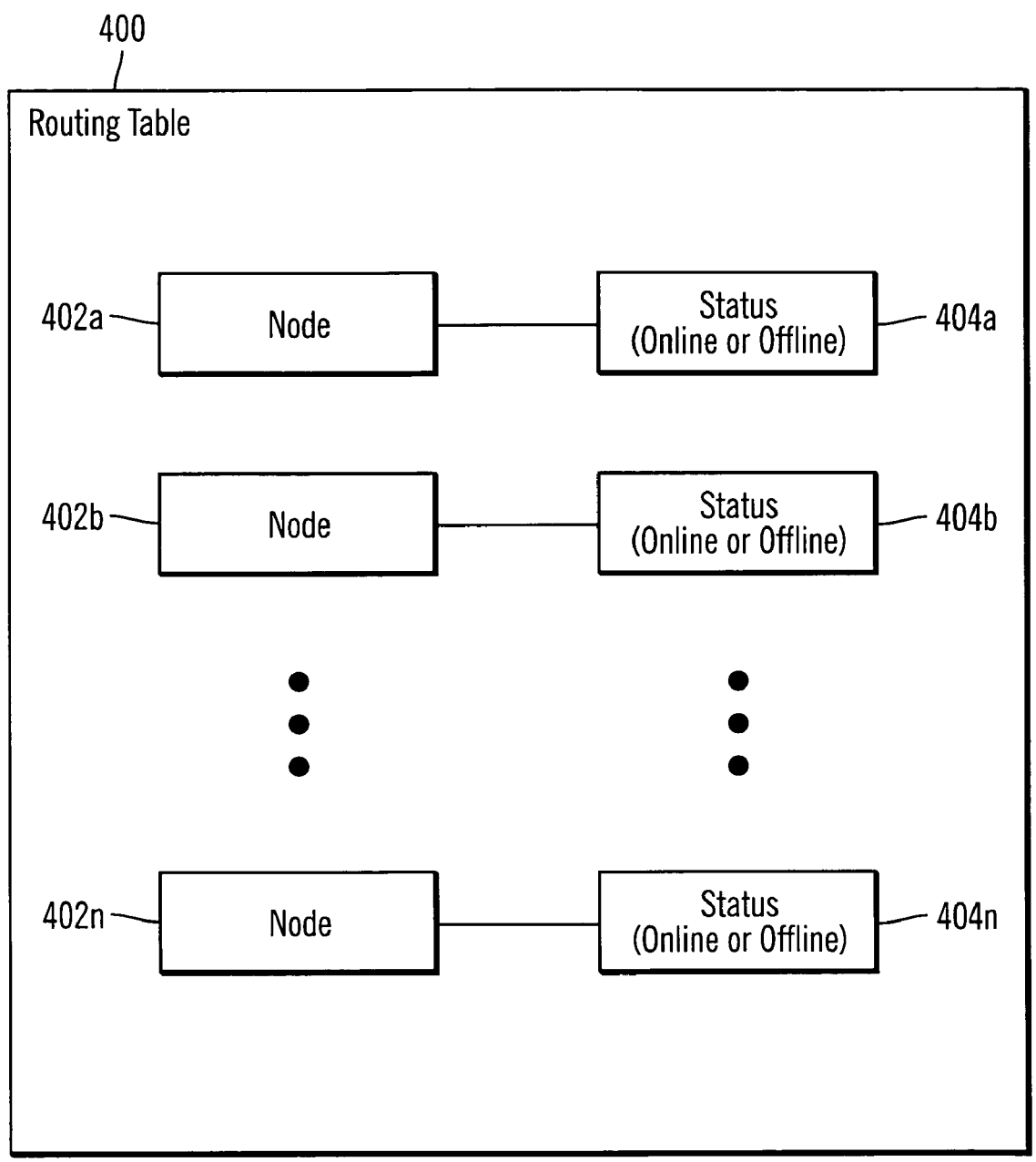
FIG. 4 illustrates a block diagram of a routing table, in accordance with certain embodiments.

FIG. 4 illustrates a block diagram of an exemplary routing table 400 that may be implemented in the nodes 108, 110, 112, 114, 200a, 200b, 200c, 200d, 302a, 302b, in accordance with certain embodiments. In certain embodiments, the exemplary routing table 400 may be an embodiment of the routing tables 204a, 204b, 204c, 204d shown in FIG. 2.

The routing table for a node may store entries corresponding to nodes and the communication status of the nodes. For example, the routing table 400 may include entries for a plurality of nodes 402a, 402b, . . . 402n, where each entry is associated with a status indicator 404a, 404b, . . . 404n. The status indicators 404a . . . 404n indicate whether the corresponding nodes are online or offline. For example, in certain exemplary embodiments the status indicator 404a may indicate that the node 402a is online, and the status indicator 404b may indicate that the node 402b is offline.

Therefore, FIG. 4, illustrates certain embodiments in which a routing table 400 stores entries that include information on the communication status of the nodes in the network 106, where the communication status for a node may indicate whether the node is online or offline.

Figure 5:
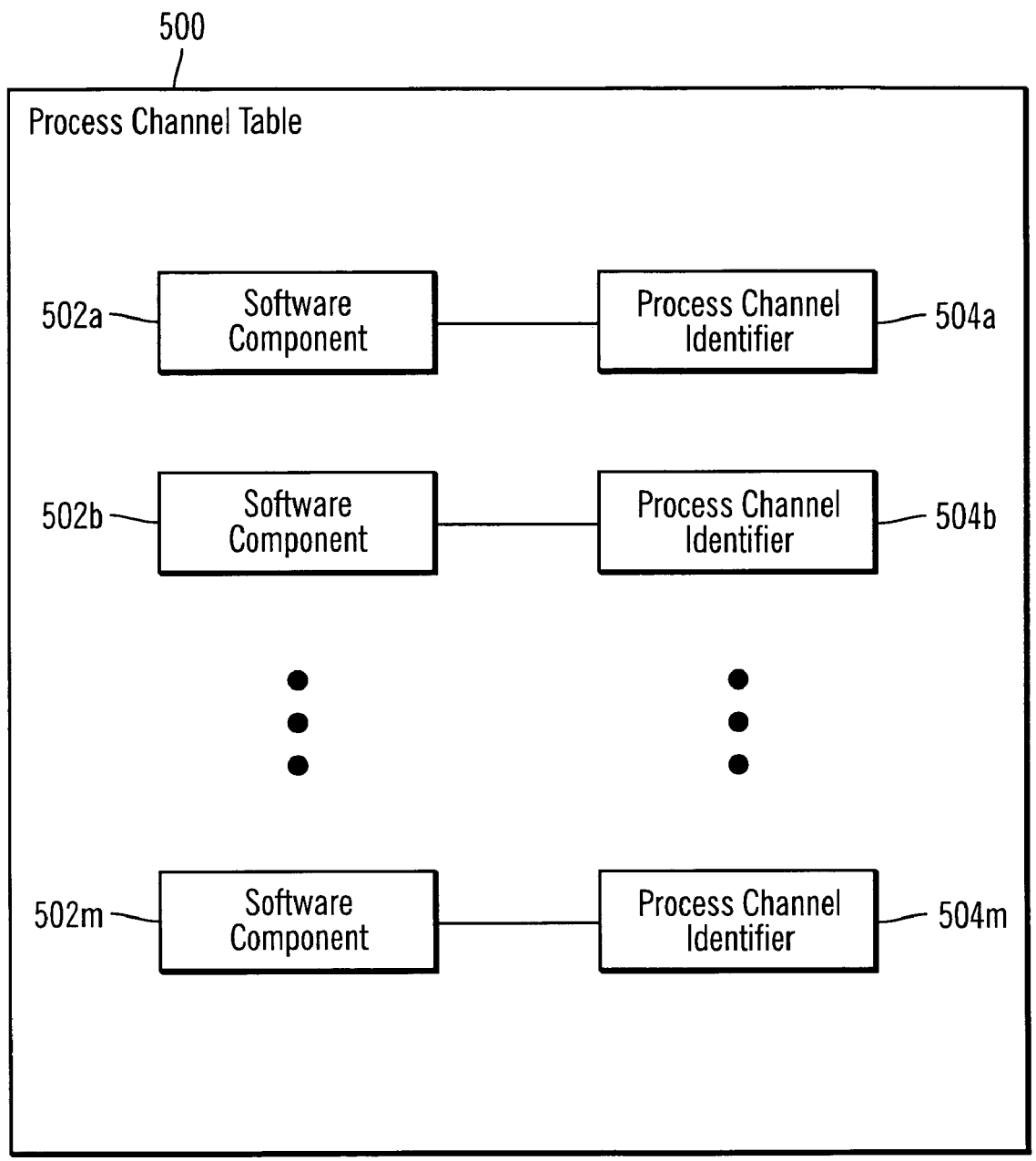
FIG. 5 illustrates a block diagram of a process channel table, in accordance with certain embodiments.

FIG. 5 illustrates a block diagram of an exemplary process channel table 500 implemented in the nodes of the computing environment 100, in accordance with certain embodiments.

The exemplary process channel table 500 may be an implementation of any of the process channel tables 206a, 206b, 206c, 206d illustrated in FIG. 2. The exemplary process channel table 500 is comprised of a plurality of exemplary software components 502a, 502b, . . . 502m that are associated with corresponding process channel identifiers 504a, 504b, . . . 504m.

Once a message is received by a node from a software component, the corresponding message router may use the process channel identifier to identify the communication channel linking the message router to the software component. For example, if the software component 502a resides on node 200a, where all the exemplary software components 502a . . . 502m are included in the software components 210a, then the process channel identifier 504a identifies the communication channel that has been established between the software component 502a and the message router 202a that runs on the node 200a.

Therefore, FIG. 5 illustrates certain embodiments in which a process channel table 500 of a selected node may store the process channel identifiers of communication channels established between the software components and the message router executing on the selected node. In certain embodiments, it is possible for a single software component to establish a plurality of communication channels to the same message router.

Figure 6:
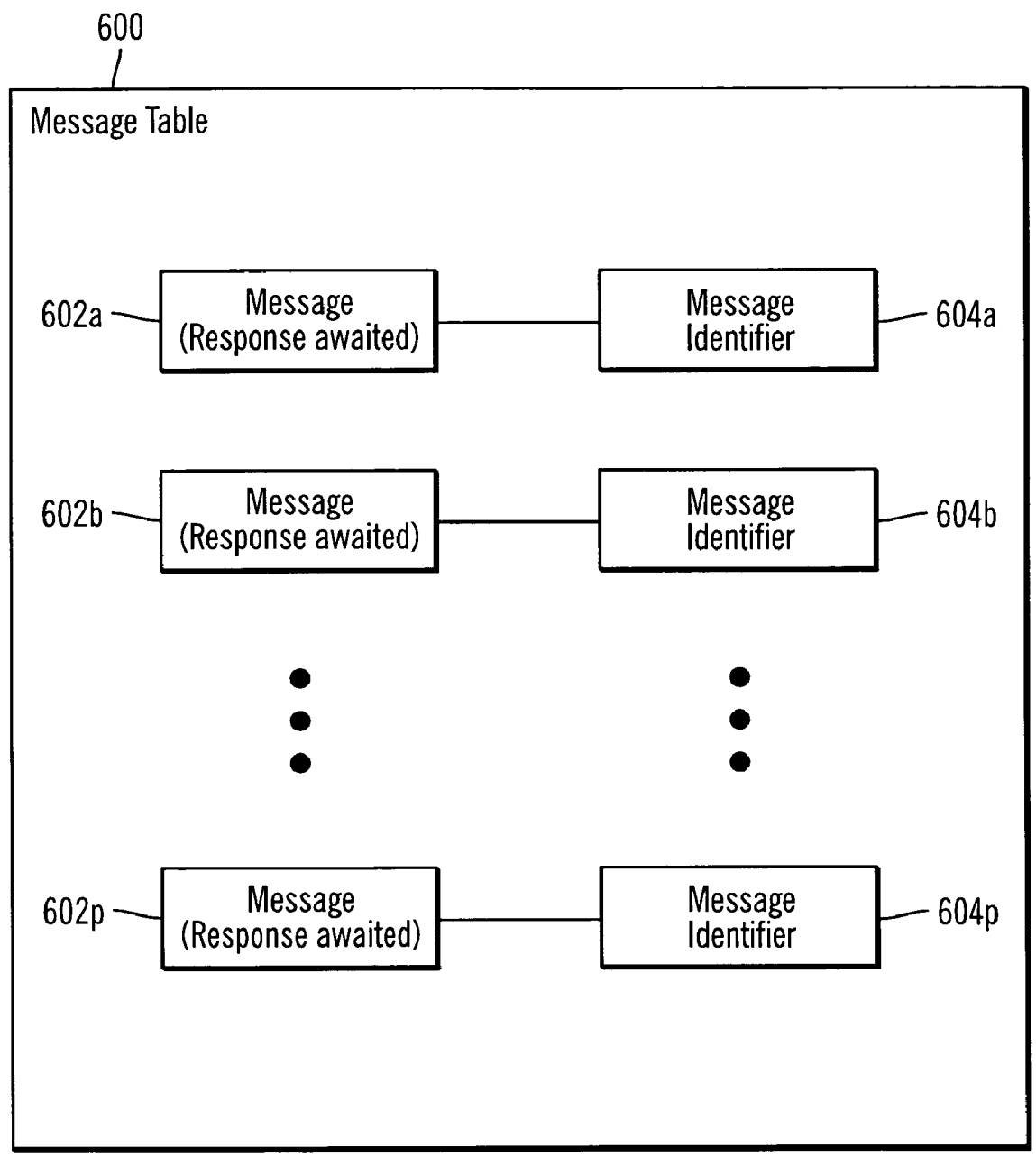
FIG. 6 illustrates a block diagram of a message table, in accordance with certain embodiments.

FIG. 6 illustrates a block diagram of an exemplary message table 600 implemented in the nodes of the computing environment 100, in accordance with certain embodiments.

The exemplary message table 600 may be implemented in any or all of the nodes of the computing environment 100. For example, the message table 600 may correspond to the message tables 208a, 208b, 208c, 208d shown in FIG. 2.

The message table 600 includes the messages 602a, 602b, . . . 602p that have been sent by a message router, and for which a response is awaited. For example, if the message table 600 is implemented on node 200a, then the message router 202a may have sent the messages 602a, 602b, . . . 602p to one or more nodes 200b, 200c, 200d that are coupled to the network 106. A message may include an unique message identifier that may in certain embodiments be stored in the header of the message. The message router may store in the message table 600, the message identifier corresponding to a sent message for which a response is awaited.

Therefore, FIG. 6 illustrates certain embodiments in which a message router populates a message table 600 to include entries for messages for which a response is awaited and corresponding message identifiers. Alternative embodiments, may structure the information stored in the message table 600 in a different manner.

Figure 7:
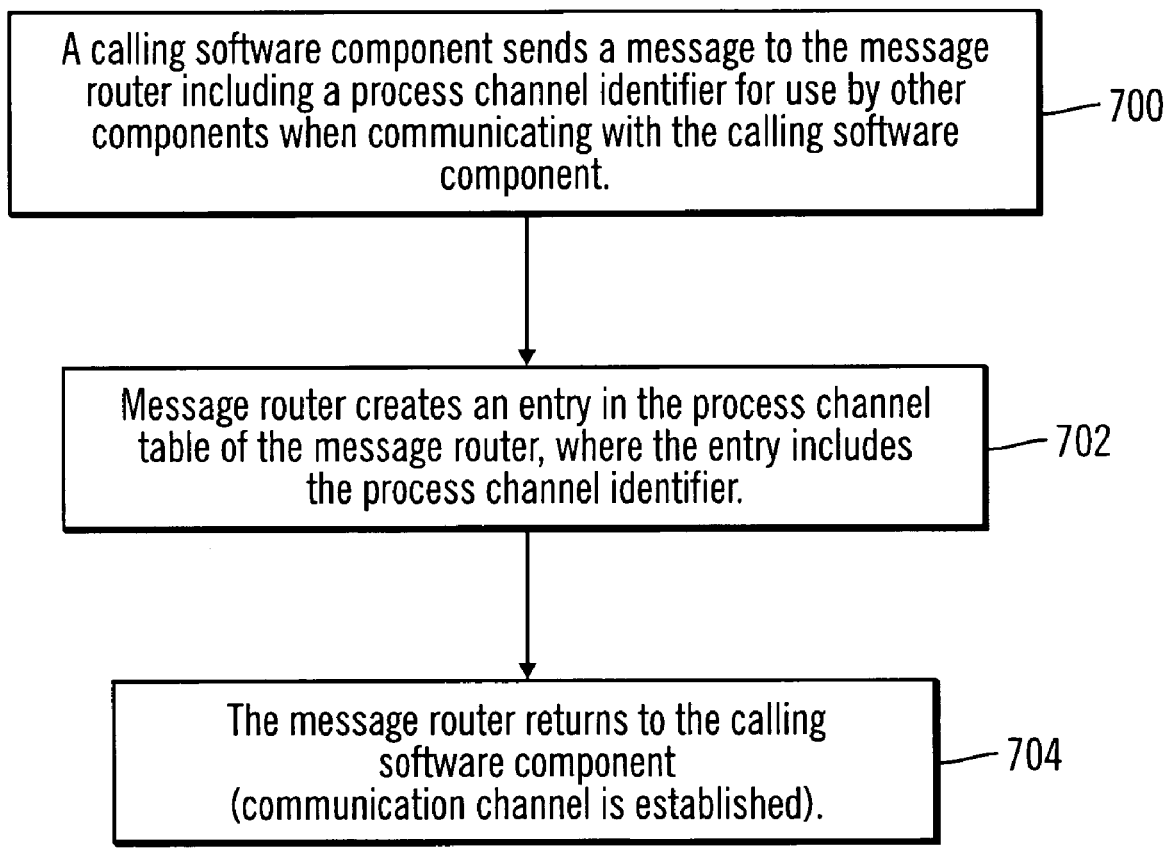
FIG. 7 illustrates operations for establishing a communication channel, in accordance with certain embodiments.

FIG. 7 illustrates operations for establishing a communication channel in the computing environment 100, in accordance with certain embodiments.

Control starts at block 700, where a calling software component, i.e., a caller, sends a message to the message router, where the message includes a process channel identifier for use by other software components when communicating with the calling software component. For example, a calling software component 502a included in a node may send a message to the message router of the node, where the message includes the process channel identifier 504a that other software components 502b . . . 502m may use to communicate with the calling software component 502a.

The message router creates (at block 702) an entry in the process channel table 500 for the process channel identifier corresponding to the message. The message router returns (at block 704) to the calling software component and a communication channel is established between the message router and the calling software component. The process channel identifier of the established communication channel was included in the message sent by the calling software component in block 700.

Therefore, FIG. 7 illustrates certain embodiments in which a communication channel is established between a calling software component and a message router on a node, where other software components on the node use the process channel identifier corresponding to the message that established the communication channel to communicate with the calling software component.

Figure 8:
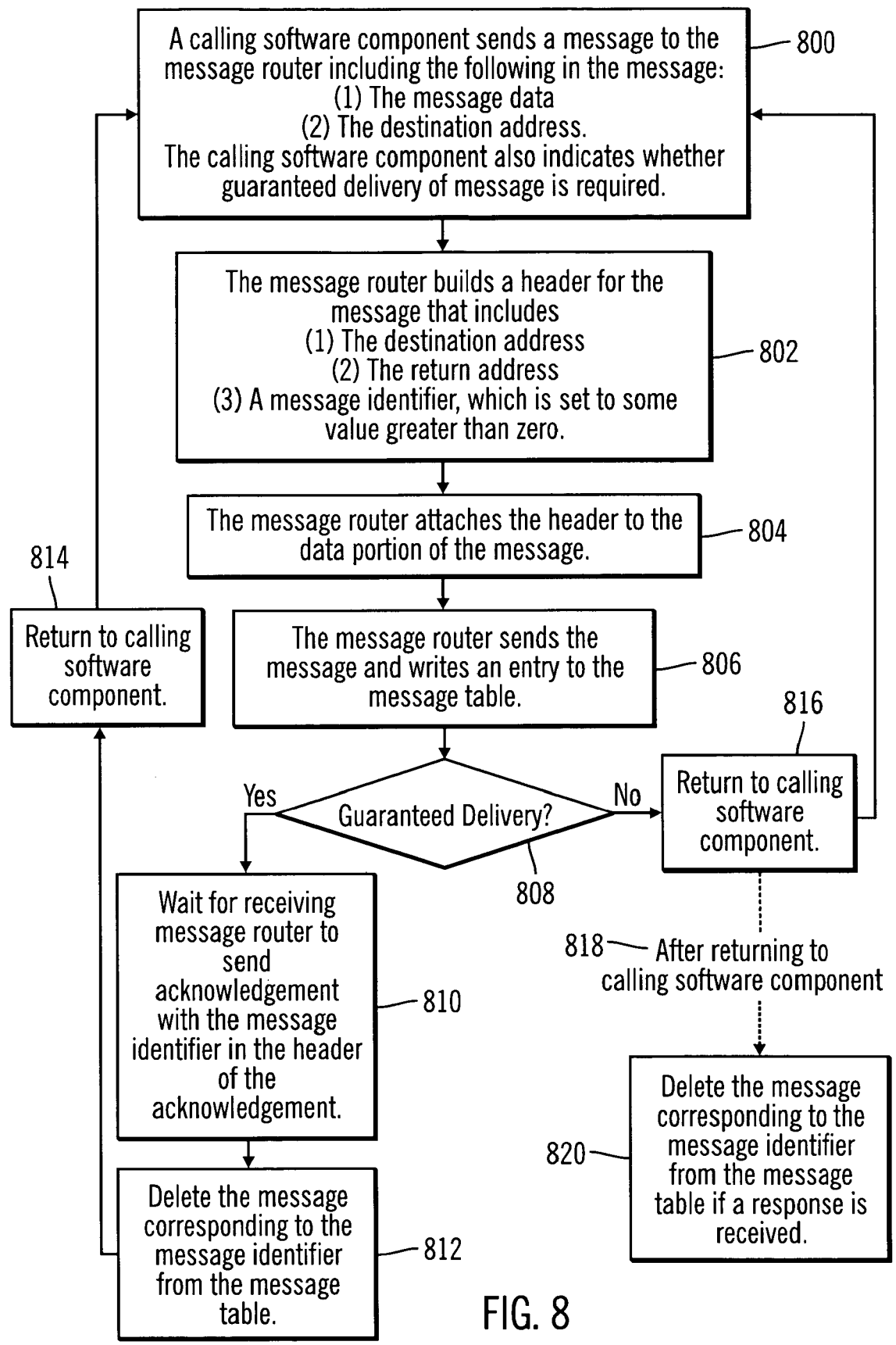
FIG. 8 illustrates operations for delivering messages, in accordance with certain embodiments.

FIG. 8 illustrates operations for delivering messages in the computing environment 100, in accordance with certain embodiments. The operations may be implemented in a calling software component and a message router that reside on the same node.

Control starts at block 800, where a calling software component on a selected node sends a message to the message router of the selected node, where the message includes the data for the message, and the destination address of the message. The destination address may correspond to another node that is coupled to the network 106. The calling software component also indicates whether guaranteed delivery of the message is required, i.e., an acknowledgement has to be received when the message is delivered to the destination address.

The message router builds (at block 802) a header for the message that includes the destination address, the return address, and a message identifier, which may be set to some value greater than zero. The destination address is the node to which the message is to be delivered, the return address is the address to which acknowledgement is to be sent, and the message identifier may provide a numeric identification to the message.

The message router attaches (at block 804) the header to the data portion of the message. Subsequently, the message router sends (at block 806) the message and writes an entry to the message table 600 that is present on the same node as the message router.

The message router determines (at block 808) whether guaranteed delivery is required for the sent message. If guaranteed delivery is required then the sending message router waits (at block 810) for the receiving message router to send an acknowledgement with the message identifier in the header of the acknowledgement. For example, if the sending message router 300a sends a message to the receiving message router 300b, then the sending message router may wait if a guaranteed delivery of the message is required.

The sending message router may delete (at block 812) the message corresponding to the message identifier from the message table 600 after receiving the acknowledgement. The sending message router returns (at block 814) to the calling software component and control may proceed to block 800.

If at block 808, the sending message router determines that guaranteed delivery of the message is not required, then the sending message router may send (at block 816) a return code to the calling software component, and after sending (at block 818) the return code the message router may delete the message corresponding to the message identifier from the message table 600 if a response is received.

Therefore, FIG. 8 illustrates certain embodiments in which an exemplary sending message router 300a sends messages to one or more receiving message routers. If guaranteed delivery of a message is required then the sending message router 300a may wait till an acknowledgement that indicates receipt of the message is received. In response to receiving the acknowledgement, the sending message router 300a deletes the entry corresponding to the sent message in the message table 600. While FIG. 8 illustrates sending a message from one message router to another, messages may also be sent from one software component to another software component in the same node.

Figure 9:
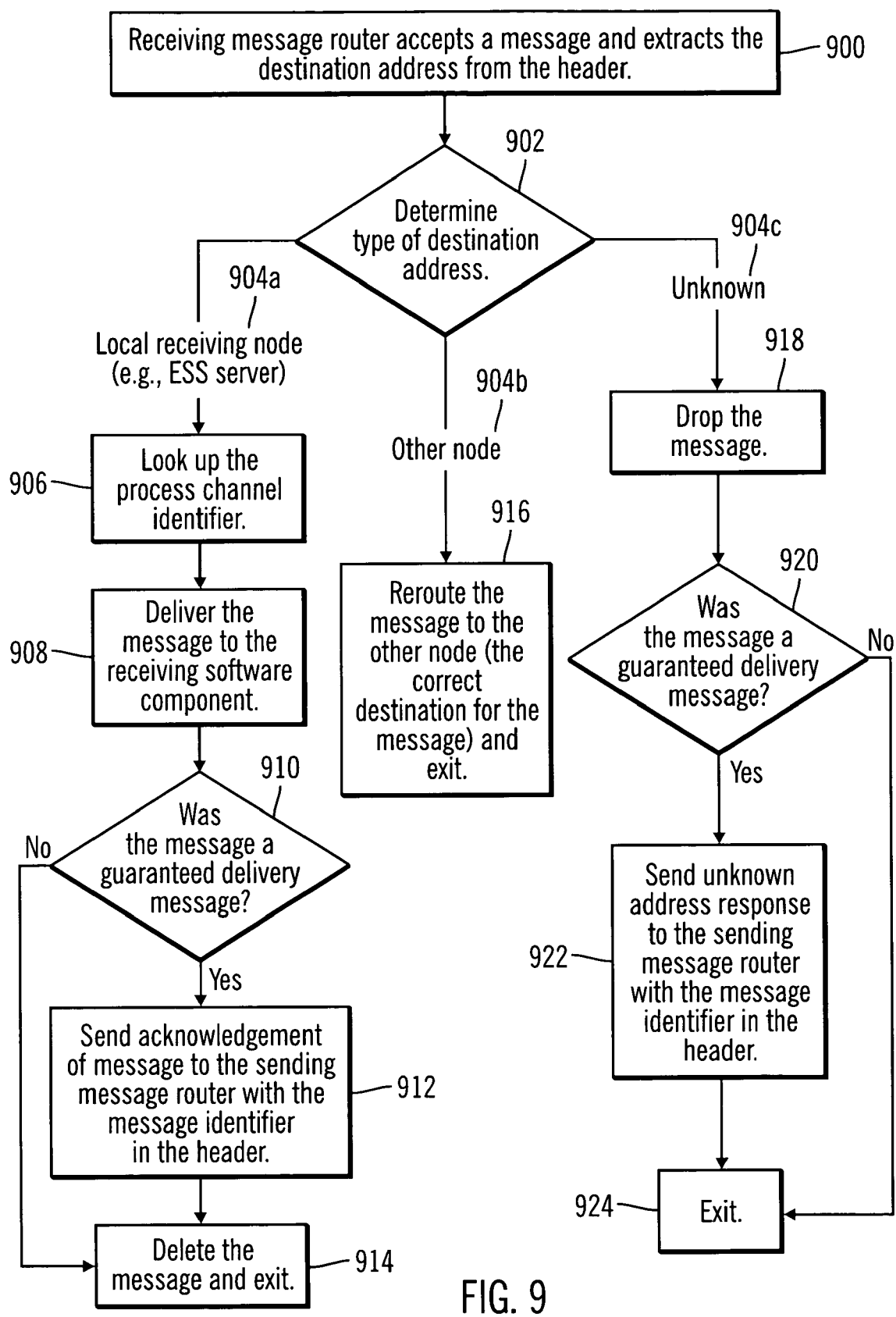
FIG. 9 illustrates operations for receiving messages, in accordance with certain embodiments.

FIG. 9 illustrates operations for receiving messages implemented in the computing environment 100, in accordance with certain embodiments. Certain operations may be implemented in the exemplary receiving message router 300b.

Control starts at block 900, where an exemplary receiving message router 300b accepts a message and extracts the destination address from the header of the message. The receiving message router 300b determines (at block 902) the type of the destination address. If the destination address indicates a local receiving node (reference numeral 904a), such as an ESS server 110, then the receiving message router 300b may look up (at block 906) the process channel identifier and deliver (at block 908) the message to the receiving software component.

The receiving message router 300b determines (at block 910) whether the received message was a message that required guaranteed delivery. If so, then the receiving message router sends (at block 912) an acknowledgement of the message to the sending message router with the message identifier that was included in the header of the received message and the message router deletes (at block 914) the message and exits. If at block 910, a determination is made that the message did not require guaranteed delivery then control proceeds to block 914.

If the receiving message router 300b determines (at block 902) that the destination address of the message is some other node (reference numeral 904b) than the node on which the message router executes, then the receiving message router reroutes (at block 916) the message to the other node that is the correct destination for the message and exits.

If the receiving message router 300b determines (at block 902) that the type of destination address is unknown (reference numeral 904c) then the receiving message router drops (at block 918) the message. The receiving message router 300b determines (at block 920) whether the message required guaranteed delivery. If so, then the receiving message router 300b sends (at block 922) an unknown address response to the sending message router with the message identifier of the received message included in the unknown address response and exits (at block 924). If the receiving message router 300b determines (at block 920) that the message did not require guaranteed delivery then the message router exits (at block 924).

Therefore, FIG. 9 illustrates certain embodiments in which a receiving message router 300b may deliver a received message to a receiving software component, or may reroute a message to another address, or may drop the message. If the received message indicates that the sender requests notification of delivery, then the receiving message router 300b may send an acknowledgement to the sender with the message identifier of the received message included in the acknowledgement.

Figure 10:
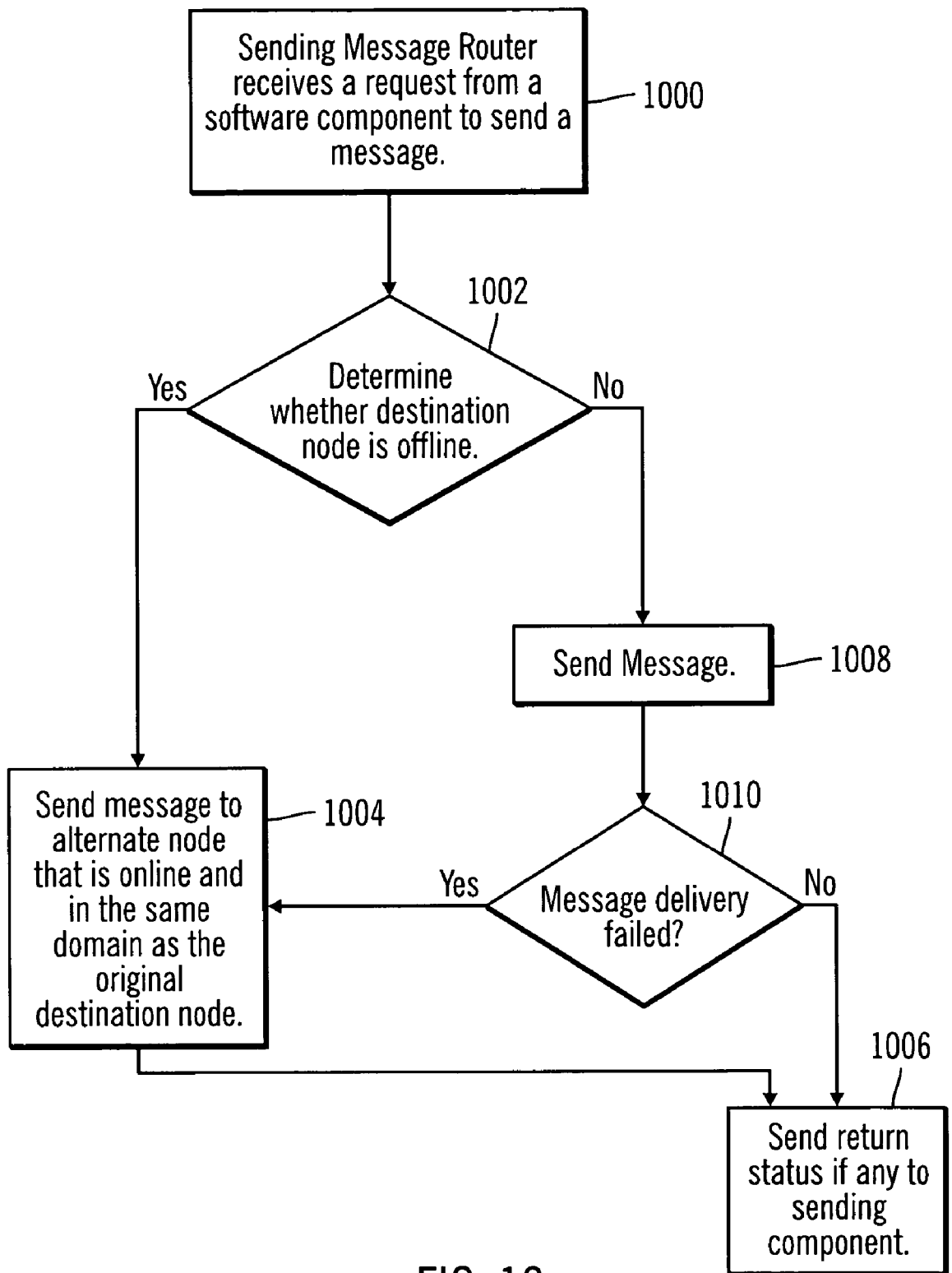
FIG. 10 illustrates operations for sending a message to an alternate node, in response to a destination node being offline, in accordance with certain embodiments.

FIG. 10 illustrates operations by an exemplary sending message router 300a for sending a message to an alternate node in case a destination node is offline, in accordance with certain embodiments.

Control starts at block 1000, where the sending message router 300a receives a request from a software component to send a message. The sending message router 300a determines (at block 1002) whether the destination node of the message is offline, by determining the status of the destination node from the routing table 400.

If the sending message router 300a determines (at block 1002) that the destination node is offline, then the sending message router 300a sends (at block 1004) the message to an alternate node that is online and that is in the same domain as the original destination node. Nodes in the same domain group may be able to substitute each other for processing messages. For example, in certain embodiments the primary image server 110 and the alternate image server 112 may be in the same domain group indicated by the storage facility 102. In such case, if the primary image server 110 is offline, then messages can be routed to the alternate image server 112 for processing. The sending message router may send (at block 1106) a return status to the software component from which the message was received.

If at block 1002, the sending message router 300a determines that destination node is online, then the sending message router 300a sends (at block 1008) the message. If the message delivery fails (at block 1010) then control proceeds to block 1004 for sending the message to an alternate node in the same domain group. If the message delivery is successful (at block 1010) then the sending message router 300a sends (at block 1006) the return status to the software component that requested the message to be sent.

Therefore, FIG. 10 illustrates certain embodiments in which a sending message router sends a message to an alternate node if the destination node for the message is offline, where the destination node and the offline node are in the same domain group.

Figure 11:
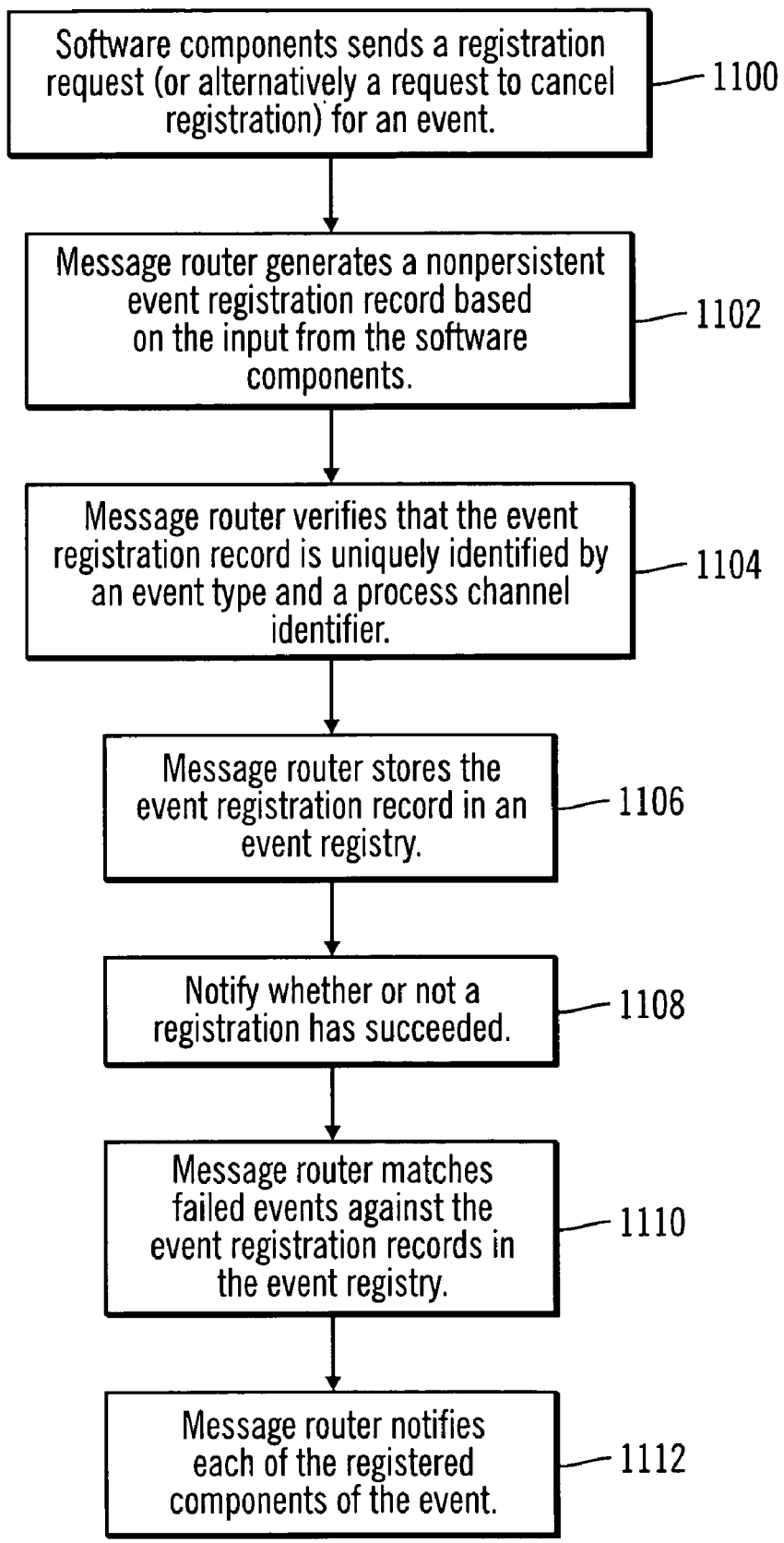
FIG. 11 illustrates operations for notifying events to registered software components, in accordance with certain embodiments.

FIG. 11 illustrates operations for notifying events to registered components implemented in the computing environment 100, in accordance with certain embodiments.

Control starts at block 1100, where software components, such as, 210a, 210b, 210c, 210d, 502a . . . 502m, send a registration (or alternatively a request to cancel registration) request for an event. The corresponding message router generates (at block 1102) a non-persistent event registration record based on the input from the software components. The message router verifies (at block 1104) that that the event registration record is uniquely identified by an event type and a process channel identifier.

The message router stores (at block 1106) the event registration record in an event registry and notifies (at block 1108) the corresponding software component on whether or not the registration request has succeeded.

Subsequently, the message router may continuously or periodically match (at block 1110) failed events against the event registration records in the event registry. The message router notifies (at block 1112) each of the registered components of the occurrence or failure of the events.

Therefore, FIG. 11 illustrates certain embodiments in which a software components may register for certain events. The message router notifies the registered software components of the occurrence or failure of the events.

Certain embodiments provide a plurality of nodes that may include storage servers coupled over a network. The plurality of nodes may send messages over the network. Each node may have a message router that communicates to other message routers and to software components. A sending message router in one node may send messages to a receiving message router in another node over the network.

Routing tables store entries that include information on the communication status of the nodes in the network, where the communication status for a node may indicate whether the node is online or offline. Process channel tables of a selected node store the identifiers of communication channels established between the software components and the message router executing on the selected node.

In certain embodiments a message router populates a message table to include entries for messages for which a response is awaited and corresponding message identifiers. A communication channel may be established between a calling software component and a message router on a node, where other software components on the node may use the process channel identifier corresponding to the message that established the communication channel to communicate with the calling software component.

In certain embodiments, a sending message router sends messages to one or more receiving message routers. If guaranteed delivery of the message is required then the sending message router may wait till an acknowledgement that indicates receipt of the message is received and then delete the entry corresponding to the sent message in the message table. Messages may also be sent from one software component to another software component in the same node.

In certain embodiments a receiving message router may deliver a received message to a receiving software component, or may reroute a message to another address, or may drop the message. If the received message indicates that the sender requests notification of delivery, then the receiving message router may send an acknowledgement to the sender with the message identifier of the received message included in the acknowledgement.

In certain embodiments a sending message router sends a message to an alternate node when the destination node for the message is offline, where the destination node and the offline node are in the same domain group. In certain embodiments software components may register for certain events. The message router notifies the registered software components of the occurrence or failure of the events.

Certain embodiments provide communication channels in an ESS network 106. End-to-end communication schemes may implement virtual channels between two ESS processes, i.e., software components of the ESS that execute. In certain embodiments, each ESS process or thread may be considered to be an end node in the ESS system. Therefore, each ESS process may communicate with other ESS processes. Certain embodiments provide for a routing and addressing scheme that allows message to be sent among applications that reside on either a remote or a local node, or between threads in the same node, using one or more mechanisms for interprocess communications.

Certain embodiments allow for reliable communications at the application level. In certain embodiments, consideration may be taken of central processing unit (CPU) usage and memory usage where such resources are constrained. Communication channels may be established using one or more mechanisms of interprocess communications. By doing so, ESS communication channels can increase performance and reduce resource usage by reducing the number of times a message is copied from the memory space of one process to another.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 12:
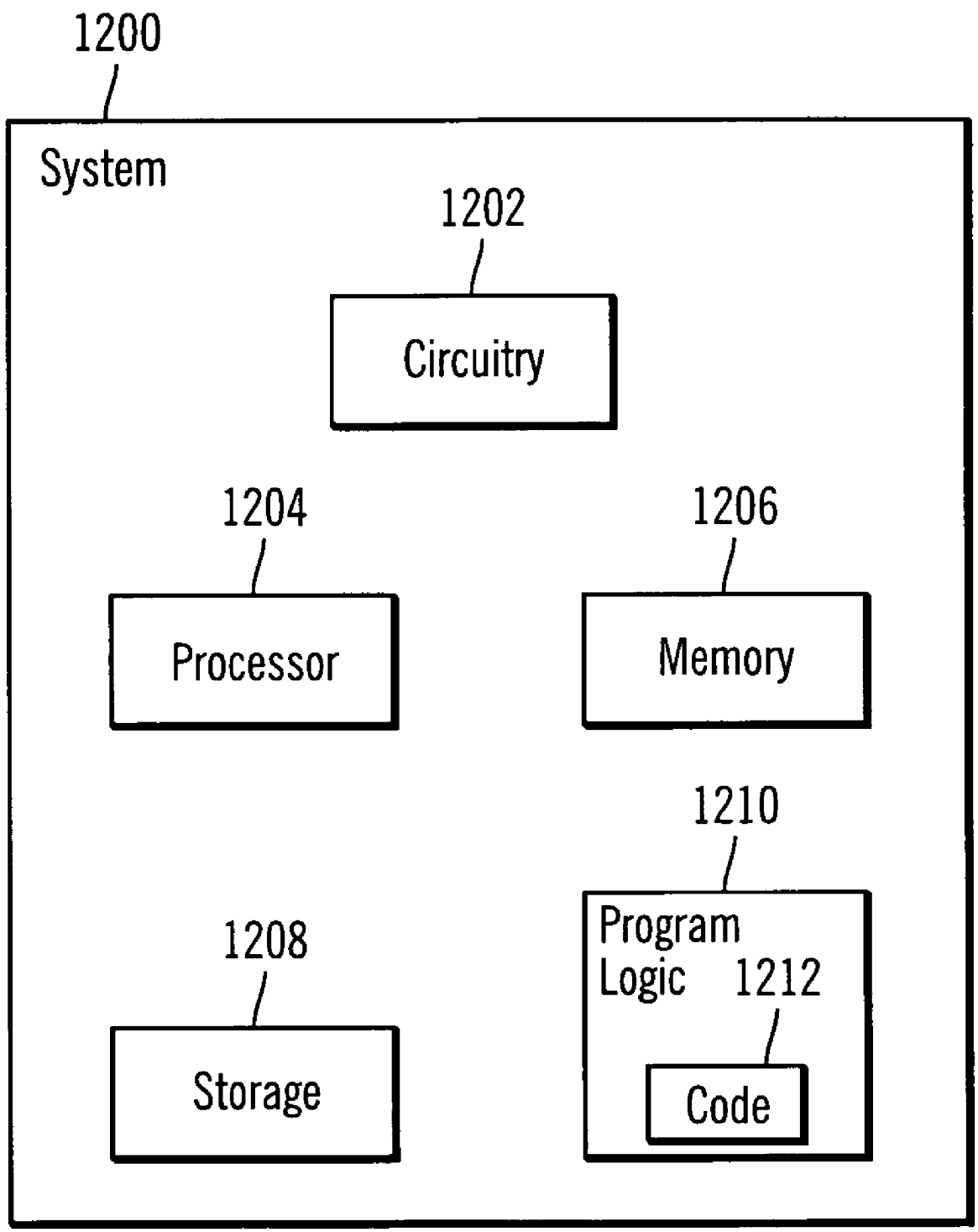
FIG. 12 illustrates a system in which certain embodiments are implemented.

FIG. 12 illustrates a block diagram of a system 1200 in which certain embodiments may be implemented. In certain embodiments, the nodes 108, 110, 112, 114, 116, 200a, 200b, 200c, 200d, 302a, 302b may be implemented in accordance with the system 1200. The system 1200 may include a circuitry 1202 that may in certain embodiments include a processor 1204. The system 1200 may also include a memory 1206 (e.g., a volatile memory device), and storage 1208. Certain elements of the system 1200 may or may not be found in some or all of the nodes 108, 110, 112, 114, 116, 200a, 200b, 200c, 200d, 302a, 302b. The storage 1208 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the processor 1204 or circuitry 1202. In certain embodiments, the program logic 1210 including code 1212 may be stored in the storage 1208. In certain other embodiments, the program logic 1210 may be implemented in the circuitry 1202. Therefore, while FIG. 12 shows the program logic 1210 separately from the other elements, the program logic 1210 may be implemented in the memory 1206 and/or the circuitry 1202.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 7-11 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-12 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

receiving, by a first application, a message from a second application, wherein both the first application and the second application execute on a node of a network that comprises a plurality of nodes, wherein the plurality of nodes are included in a plurality of storage facilities, wherein the plurality of storage facilities include primary and alternate image servers that comprise the plurality of nodes, and wherein the node on which the first application and the second application execute is included in a first storage facility of the plurality of storage facilities;

receiving, by the first application, an identifier corresponding to a channel over which at least one other application can communicate with the second application, wherein the channel is a logical connection at an application level;

storing the identifier corresponding to the channel with an identity of the second application; and accessing the stored identifier to allow the at least one other application to communicate with the second application over the channel, wherein a second storage facility of the plurality of storage facilities comprises a primary image server and an alternate image server that are in a same domain group indicated by the second storage facility, wherein the alternate image server stores backup data of the primary image server, and wherein the received message is sent to the alternate image server of the second storage facility in response to determining by the first application executing in the node of the first storage facility that that the primary image server is offline, the method further comprising:

(A) sending by software components a registration request for an event;

(B) generating, by the first application, a non-persistent event registration record based on input received from the software components, and verifying, by the first application, that the non-persistent event registration record is uniquely identified by one event type and one channel identifier;

(C) storing, by the first application, the non-persistent event registration record in an event registry, and notifying, by the first application, corresponding software components on whether the registration request has succeeded; and (D) matching by the first application, failed events against event registration records in the event registry, and notifying, by the first application, the software components of occurrence or failure of events.

2. The method of claim 1, wherein the network is a storage area network, wherein the node is a storage server, wherein the first application is a message router, wherein the second application and the at least one other application comprise selected software components, and wherein some software components register with the message router to be informed of events over channels, and wherein each of the plurality of nodes include;

(i) at least one software component;

(ii) at least one message router that sends and receives messages over the network;

(iii) at least one routing table that includes first entries correspond to a set of nodes and a status field that indicates online or offline status of selected nodes;

(iv) at least one process channel table that include second entries corresponding to the software components and associated process channel identifiers; and (v) at least one message table.

3. The method of claim 1, wherein the node is a first node, and wherein the method further comprises:

storing in a routing table, entries that include information on a communication status of at least one node of the plurality of nodes in the network, wherein the communication status of the at least one node indicates whether the at least one node is offline; and sending, by the first application, the received message to an alternate node, in response to determining from the routing table that a destination address of the received message corresponds to the offline node.

4. The method of claim 1, wherein the node is a first node, and wherein the method further comprises:

generating, by the first application, a message identifier that uniquely identifies the message;

inserting the message identifier in a header of the message;

sending the message to a second node of the plurality of nodes;

receiving a notification that indicates receipt of the message from the second node, wherein the notification includes the generated message identifier; and communicating, by the first application, to the second application that the message has been successfully delivered.

5. The method of claim 4, wherein the method further comprises: receiving, by a message router at the second node, the message;

delivering the message to one application in the second node, in response to determining that the message is for the second node;

rerouting the message to a third node, in response to determining that the message is for the third node; and deleting the received message, in response to determining that a destination of the message is unknown.

6. The method of claim 1, wherein the node is a first node, and wherein the method further comprises:
- sending the message and awaiting an acknowledgement of a reception of the message;
- deleting an entry corresponding to the message if the acknowledgement is received; and
- communicating to the second application an indication of the reception of the message, wherein the communicating is over the channel.

7. A system in communication with a network of a plurality of nodes, the system comprising:
- memory; and
- a processor coupled to the memory, wherein the processor is capable of performing operations, the operations comprising:
  - (i) receiving, by a first application, a message from a second application, wherein both the first application and the second application execute on a node of the network, wherein the plurality of nodes are included in a plurality of storage facilities, wherein the plurality of storage facilities include primary and alternate image servers that comprise the plurality of nodes, and wherein the node on which the first application and the second application execute is included in a first storage facility of the plurality of storage facilities;
  - (ii) receiving, by the first application, an identifier corresponding to a channel over which at least one other application can communicate with the second application, wherein the channel is a logical connection at an application level;
  - (iii) storing the identifier corresponding to the channel with an identity of the second application; and
  - (iv) accessing the stored identifier to allow the at least one other application to communicate with the second application over the channel, wherein a second storage facility of the plurality of storage facilities comprises a primary image server and an alternate image server that are in a same domain group indicated by the second storage facility, wherein the alternate image server stores backup data of the primary image server, and wherein the received message is sent to the alternate image server of the second storage facility in response to determining by the first application executing in the node of the first storage facility that that the primary image server is offline, the operations further comprising:
    - (A) sending by software components a registration request for an event;
    - (B) generating, by the first application, a non-persistent event registration record based on input received from the software components, and verifying, by the first application, that the non-persistent event registration record is uniquely identified by one event type and one channel identifier;
    - (C) storing, by the first application, the non-persistent event registration record in an event registry, and notifying, by the first application, corresponding software components on whether the registration request has succeeded; and
    - (D) matching by the first application, failed events against event registration records in the event registry, and notifying, by the first application, the software components of occurrence or failure of events.

8. The system of claim 7, wherein the network is a storage area network, wherein the first application is a message router, wherein the second application and the at least one other application comprise software components, and wherein some software components register with the message router to be informed of events over channels, and wherein each of the plurality of nodes include;
- (i) at least one software component;
- (ii) at least one message router that sends and receives messages over the network;
- (iii) at least one routing table that includes first entries correspond to a set of nodes and a status field that indicates online or offline status of selected nodes;
- (iv) at least one process channel table that include second entries corresponding to the software components and associated process channel identifiers; and
- (v) at least one message table.

9. The system of claim 7, wherein the node is a first node, and wherein the operations further comprise:
- storing in a routing table, entries that include information on a communication status of at least one node of the plurality of nodes in the network, wherein the communication status of the at least one node indicates whether the at least one node is offline; and
- sending, by the first application, the received message to an alternate node, in response to determining from the routing table that a destination address of the received message corresponds to the offline node.

10. The system of claim 7, wherein the node is a first node, and wherein the operations further comprise:
- generating, by the first application, a message identifier that uniquely identifies the message;
- inserting the message identifier in a header of the message;
- sending the message to a second node of the plurality of nodes;
- receiving a notification that indicates receipt of the message from the second node, wherein the notification includes the generated message identifier; and
- communicating, by the first application, to the second application that the message has been successfully delivered.

11. The system of claim 10, wherein the operations further comprise: receiving, by a message router at the second node, the message;
- delivering the message to one application in the second node, in response to determining that the message is for the second node;
- rerouting the message to a third node, in response to determining that the message is for the third node; and
- deleting the received message, in response to determining that a destination of the message is unknown.

12. The system of claim 7, wherein the node is a first node, and wherein the operations further comprise:
- sending the message and awaiting an acknowledgement of a reception of the message;
- deleting an entry corresponding to the message if the acknowledgement is received; and
- communicating to the second application an indication of the reception of the message, wherein the communicating is over the channel.

13. An article of manufacture for communication in a network having a plurality of nodes, wherein the article of manufacture is capable of causing operations, the operations comprising:
- receiving, by a first application, a message from a second application, wherein both the first application and the second application execute on a node of the network, wherein the plurality of nodes are included in a plurality of storage facilities, wherein the plurality of storage facilities include primary and alternate image servers that comprise the plurality of nodes, and wherein the node on which the first application and the second application execute is included in a first storage facility of the plurality of storage facilities;

receiving, by the first application, an identifier corresponding to a channel over which at least one other application can communicate with the second application, wherein the channel is a logical connection at an application level;

storing the identifier corresponding to the channel with an identity of the second application; and accessing the stored identifier to allow the at least one other application to communicate with the second application over the channel, wherein a second storage facility of the plurality of storage facilities comprises a primary image server and an alternate image server that are in a same domain group indicated by the second storage facility, wherein the alternate image server stores backup data of the primary image server, and wherein the received message is sent to the alternate image server of the second storage facility in response to determining by the first application executing in the node of the first storage facility that that the primary image server is offline, the operations further comprising:

(A) sending by software components a registration request for an event;

(B) generating, by the first application, a non-persistent event registration record based on input received from the software components, and verifying, by the first application, that the non-persistent event registration record is uniquely identified by one event type and one channel identifier;

(C) storing, by the first application, the non-persistent event registration record in an event registry, and notifying, by the first application, corresponding software components on whether the registration request has succeeded; and (D) matching by the first application, failed events against event registration records in the event registry, and notifying, by the first application, the software components of occurrence or failure of events.

14. The article of manufacture of claim 13, wherein the network is a storage area network, wherein the node is a storage server, wherein the first application is a message router, wherein the second application and the at least one other application comprise software components, and wherein some software components register with the message router to be informed of events over channels, and wherein each of the plurality of nodes include;

(i) at least one software component;
(ii) at least one message router that sends and receives messages over the network;
(iii) at least one routing table that includes first entries correspond to a set of nodes and a status field that indicates online or offline status of selected nodes;
(iv) at least one process channel table that include second entries corresponding to the software components and associated process channel identifiers; and
(v) at least one message table.

15. The article of manufacture of claim 13, wherein the node is a first node, and wherein the operations further comprise:

storing in a routing table, entries that include information on a communication status of at least one node of the plurality of nodes in the network, wherein the communication status of the at least one node indicates whether the at least one node is offline; and sending, by the first application, the received message to an alternate node, in response to determining from the routing table that a destination address of the received message corresponds to the offline node.

16. The article of manufacture of claim 13, wherein the node is a first node, and wherein the operations further comprise:

generating, by the first application, a message identifier that uniquely identifies the message;

inserting the message identifier in a header of the message;

sending the message to a second node of the plurality of nodes;

receiving a notification that indicates receipt of the message from the second node, wherein the notification includes the generated message identifier; and communicating, by the first application, to the second application that the message has been successfully delivered.

17. The article of manufacture of claim 16, wherein the operations further comprise:

receiving, by a message router at the second node, the message;

delivering the message to one application in the second node, in response to determining that the message is for the second node;

rerouting the message to a third node, in response to determining that the message is for the third node; and deleting the received message, in response to determining that a destination of the message is unknown.

18. The article of manufacture of claim 13, wherein the node is a first node, and wherein the operations further comprise:

sending the message and awaiting an acknowledgement of a reception of the message;

deleting an entry corresponding to the message if the acknowledgement is received; and communicating to the second application an indication of the reception of the message, wherein the communicating is over the channel.

19. A method for deploying computing infrastructure, comprising integrating computer-readable code into a computing system, wherein the code in combination with the computing system is capable of performing:

receiving, by a first application, a message from a second application, wherein both the first application and the second application execute on a node of a network that comprises a plurality of nodes, wherein the plurality of nodes are included in a plurality of storage facilities, wherein the plurality of storage facilities include primary and alternate image servers that comprise the plurality of nodes, and wherein the node on which the first application and the second application execute is included in a first storage facility of the plurality of storage facilities;

receiving, by the first application, an identifier corresponding to a channel over which at least one other application can communicate with the second application, wherein the channel is a logical connection at an application level;

storing the identifier corresponding to the channel with an identity of the second application; and accessing the stored identifier to allow the at least one other application to communicate with the second application over the channel, wherein a second storage facility of the plurality of storage facilities comprises a primary image server and an alternate image server that are in a same domain group indicated by the second storage facility, wherein the alternate image server stores backup data of the primary image server, and wherein the received message is sent to the alternate image server of the second storage facility in response to determining by the first application executing in the node of the first storage facility that that the primary image server is offline, wherein the code in combination with the computing system is further capable of performing:

(A) sending by software components a registration request for an event;

(B) generating, by the first application, a non-persistent event registration record based on input received from the software components, and verifying, by the first application, that the non-persistent event registration record is uniquely identified by one event type and one channel identifier;

(C) storing, by the first application, the non-persistent event registration record in an event registry, and notifying, by the first application, corresponding software components on whether the registration request has succeeded; and (D) matching by the first application, failed events against event registration records in the event registry, and notifying, by the first application, the software components of occurrence or failure of events.

20. The method of deploying computing infrastructure of claim 19, wherein the network is a storage area network, wherein the node is a storage server, wherein the first application is a message router, wherein the second application and the at least one other application comprise selected software components, and wherein some software components register with the message router to be informed of events over channels, and wherein each of the plurality of nodes include;

(i) at least one software component;

(ii) at least one message router that sends and receives messages over the network;

(iii) at least one routing table that includes first entries correspond to a set of nodes and a status field that indicates online or offline status of selected nodes;

(iv) at least one process channel table that include second entries corresponding to the software components and associated process channel identifiers; and (v) at least one message table.

* * * * *